# United States Patent
Tang et al.

(10) Patent No.: US 10,115,415 B1
(45) Date of Patent: Oct. 30, 2018

(54) MAGNETIC PULSE RECORDING SCHEME IN PERPENDICULAR MAGNETIC RECORDING

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/933,486

(22) Filed: Mar. 23, 2018

(51) Int. Cl.
  *G11B 5/09* (2006.01)
  *G11B 5/012* (2006.01)

(52) U.S. Cl.
  CPC .......... *G11B 5/012* (2013.01); *G11B 5/09* (2013.01)

(58) Field of Classification Search
  None
  See application file for complete search history.

(56) References Cited

U.S. PATENT DOCUMENTS

| | | | |
|---|---|---|---|
| 4,873,680 A | 10/1989 | Chung et al. | |
| 5,410,521 A * | 4/1995 | Osato | G11B 5/00 360/59 |
| 5,512,366 A * | 4/1996 | Nakaki | G11B 11/10515 369/13.44 |
| 5,920,449 A * | 7/1999 | Tagawa | G11B 5/1278 360/122 |
| 8,619,516 B1 * | 12/2013 | Matsumoto | G11B 5/314 369/13.33 |
| 8,743,667 B1 * | 6/2014 | Brockie | G11B 5/607 369/13.33 |
| 9,105,276 B2 | 8/2015 | Livshitz et al. | |
| 2004/0120062 A1 * | 6/2004 | Yip | G11B 5/00 360/48 |
| 2007/0097548 A1 * | 5/2007 | Taguchi | G11B 5/1278 360/125.03 |
| 2007/0279803 A1 * | 12/2007 | Hirata | B82Y 10/00 360/125.33 |

(Continued)

*Primary Examiner* — Peter Vincent Agustin
(74) *Attorney, Agent, or Firm* — Saile Ackerman LLC; Stephen B. Ackerman (57) ABSTRACT

A magnetic pulse recording method is disclosed wherein a magnetic field is turned off for a portion ($t_{OFF}$) of a bit duration before or after total recording time is completed for each bit. Typical bit lengths of 10 nm to 50 nm must be less than the main pole down-track length, and total recording time ($t_{REC}$) must be less than the bit duration such that bit duration equals ($t_{REC}+t_{OFF}$). In a random bit sequence, $t_{REC}$ may be maintained for each bit while $t_{OFF}$ increases as bit duration increases. The method applies to mobile hard disk drives (HDD) with 2.5 inch disks, and to nearline HDD with 3.5 inch disks where bit durations vary from 0.3 to 1.2 ns for recording velocities between 10 and 47 m/sec. The time required to turn off the field may be <10 picoseconds, and comprise a linear or non-linear waveform.

23 Claims, 6 Drawing Sheets

(56) References Cited

U.S. PATENT DOCUMENTS

2007/0285837 A1\* 12/2007 Im .................. G11B 5/1278
 360/125.03
2009/0059438 A1\* 3/2009 Anagawa ............ G11B 5/1278
 360/319

\* cited by examiner

MAGNETIC PULSE RECORDING SCHEME IN PERPENDICULAR MAGNETIC RECORDING

TECHNICAL FIELD

The present disclosure relates to a reduced duty cycle time for perpendicular magnetic recording (PMR) by incorporating a pulse recording scheme wherein the magnetic field is turned off during a portion of the write process for conditions where total magnetic recording time is less than the duration of a bit, and when the bit length is less than the down track length of the main pole write bubble on the media thereby improving cross-track performance including tracks per inch (TPI) capability while maintaining bits per inch (BPI) capability.

BACKGROUND

A PMR write head typically has a main pole with a small surface area at an air bearing surface (ABS), and coils that conduct a write current and generate a magnetic flux in the main pole such that the magnetic flux exits through a main pole tip and enters a magnetic medium (disk) adjacent to the ABS. Magnetic flux is used to write a plurality of bits in the magnetic medium where the bits have various lengths that are in integer multiples of a minimum bit length T such as 1 T, 2 T, 3 T, etc. Bits are arranged in concentric tracks found in multiple radial regions that are classified as an inner diameter (ID), middle diameter (MD), and outer diameter (OD). In some schemes such as shingled magnetic recording, tracks are written in a sequential manner from ID to OD, from OD to ID, or from OD and ID towards MD.

The hard disk drive (HDD) also known as a magnetic recording apparatus has a central processor unit (CPU) and a read/write channel that encodes digital information into analog signals during a write process. There is also a preamplifier or preamp, which is a chip in the HDD that controls the read/write heads and amplifies signals to and from the heads. The main pole in the PMR write head is driven by a current waveform that generates the magnetic fields needed to write the bipolar bits in the magnetic medium. Write current waveforms are generated by the preamp and have a large impact on the dynamic magnetic field profiles during the write (recording) process. Typical waveform settings include the write current amplitude (Iw), overshoot amplitude (OSA), overshoot duration (OSD), current rise time (Tr), current fall time (Tf), and write data frequency (Fw). These parameters may be tuned to adjust one or more of BPI, TPI capability, and area density capability (ADC) in the HDD. A write head that can deliver higher BPI and higher TPI is essential to ADC improvement.

As HDD technology advances, there is a need to continually shrink the main pole (MP) dimensions at the ABS in order to satisfy requirements for ADC growth. However, a certain MP tip volume is required in order to sustain sufficient writability on the media plane. Therefore, an alternative means of improving ADC through larger TPI is desirable that complements improvements achieved through new MP and surrounding shield designs. In particular, a new write scheme is needed that is compatible with MP down-track tip lengths of 50-150 nm, and with minimum bit lengths of around 10 nm.

SUMMARY

One objective of the present disclosure is to provide a write scheme for a PMR writer that enables a reduced duty cycle during magnetic recording and is effective with main pole lengths in the 50-150 nm range and with bit lengths as small as 10 nm.

Another objective of the present disclosure is to provide a write scheme according to the first objective that is useful for media storage densities of 2000 kilo flux changes per inch (kFCI) or higher.

According to one embodiment of the present disclosure, these objectives are achieved with a magnetic pulse recording scheme in which the main pole is not maintained in a saturated state during transit over the entire bit length in each bit. Instead, the preamp is programmed to turn off the magnetic recording field during a certain period of time as the main pole moves over each bit on the recording medium. The magnetic pulse recording scheme is operable when two conditions are satisfied. First, the total recording time including current rise time, magnetic field rise time, and media switching time must be less than the duration of the bit. Secondly, the bit length must be less than the down-track length of the main pole write bubble on the media. Generally, main pole down-track tip length is kept within a range of 50-150 nm to sustain sufficient writability on the media plane. Thus, typical bit lengths of 10 to 50 nm in advanced HDD designs will satisfy the second condition. Furthermore, total recording times of less than about 400 ps will be sufficient to meet the first condition for most of the 1 T to 6 T bits in 2.5" and 3.5" HDD at 2000 kFCI or higher linear density with recording velocities around 5400 to 10000 rpm.

The duration of the write window with the magnetic field on is determined by the total recording time. Different recording systems, including different writer/media structures and different preamps, may have a total recording time that varies from one design to the next. As a result, each design may require optimization of magnetic pulse recording parameters to control the write window. After the magnetic pulse finishes writing each bit, the magnetic field from the main pole is turned off by various methods. According to one embodiment, the magnetic field strength is reduced to zero in the shortest period. In alternative embodiments, the magnetic field is reduced to zero with a linear slope or by another waveform shape.

DETAILED DESCRIPTION

The present disclosure relates to a magnetic pulse recording scheme that is controlled by a preamp in a HDD, and may be incorporated in both mobile and nearline storage systems. As disclosed herein, magnetic pulse recording enables total recording time on a plurality of bits in a magnetic medium to be substantially reduced compared with conventional recording thereby improving cross-track gradient (TPI capability) while maintaining on-track performance (BPI) and signal-to-noise ratio (SNR). In the drawings, the y-axis is a cross-track direction, the z-axis is a down-track direction, and the x-axis is in a direction orthogonal to the ABS and towards a back end of the device. The terms "magnetic field profile" and "magnetic field waveform" may be used interchangeably.

Figure 1:
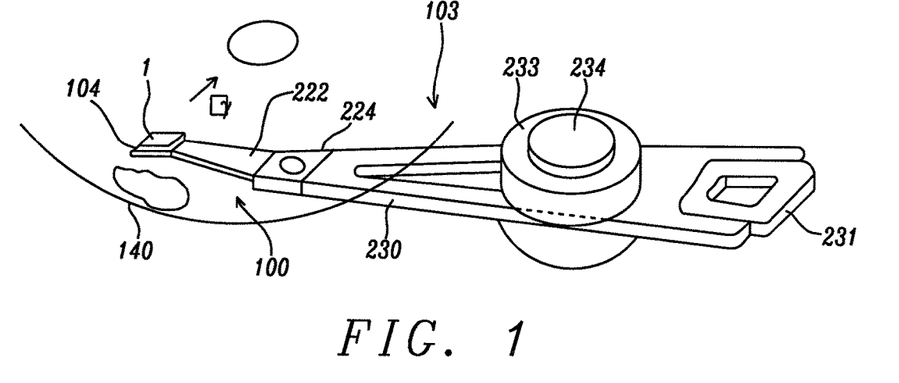
FIG. 1 is a perspective view of a head arm assembly of the present disclosure.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
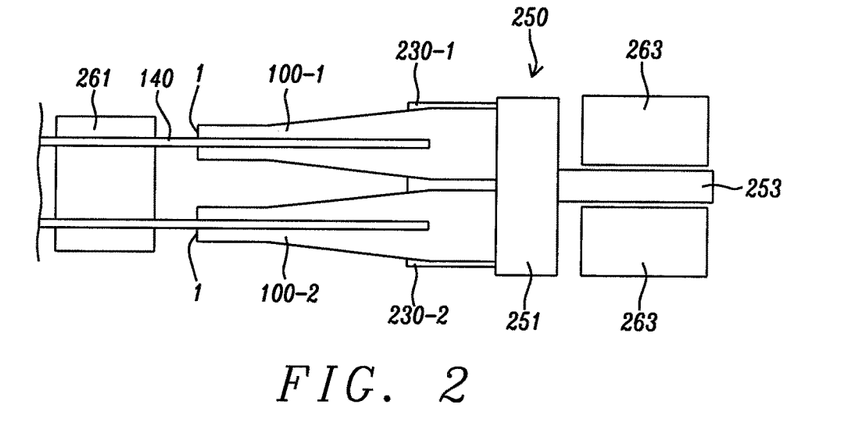
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
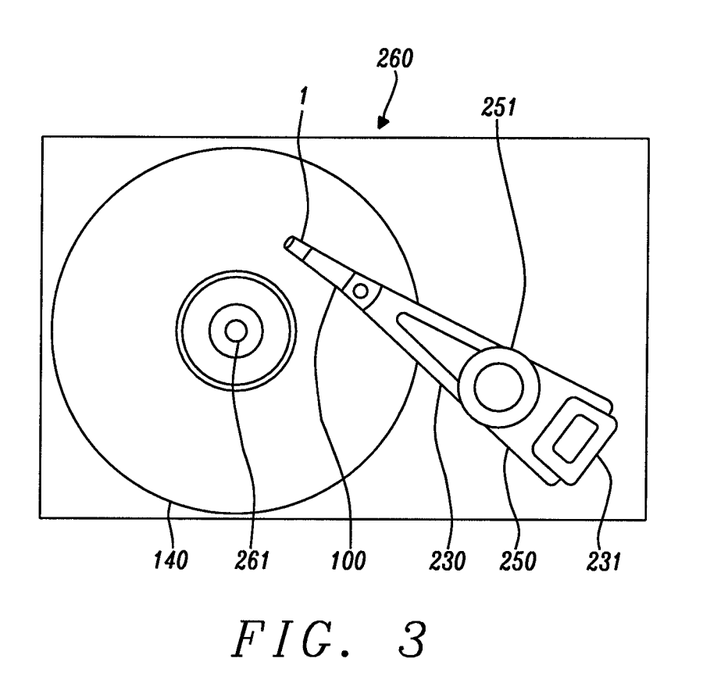
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
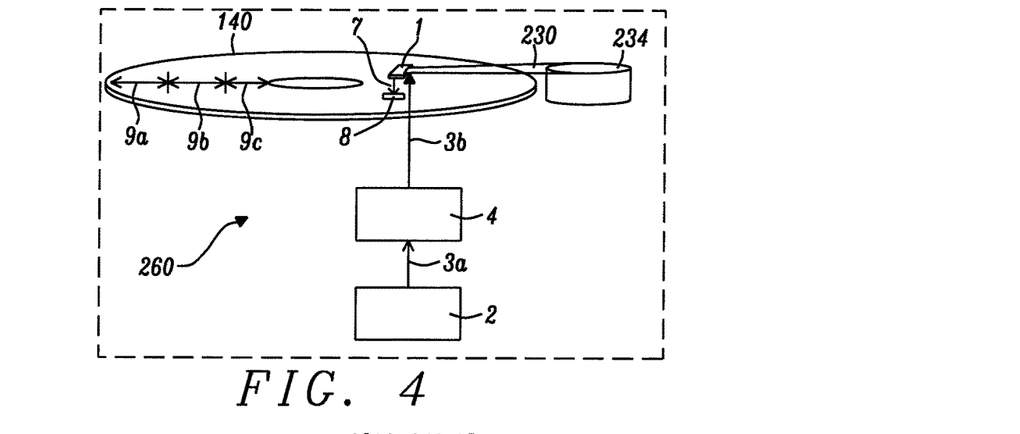
FIG. 4 shows a HDD layout where recording data from a controller is converted into a recording current by a preamp and delivered to a write head which generates a magnetic field to write a bit on a magnetic medium.

Referring to FIG. 4, a partial layout of a magnetic recording apparatus 260 is provided and depicts key components for enabling the magnetic pulse recording scheme of the present disclosure. The magnetic recording apparatus comprises a circuit wherein a controller 2 sends programmed codes in the form of a recording data sequence 3a to a preamplifier (preamp) 4. The preamp is configured to convert the data to a recording current 3b that is transmitted to a magnetic recording head 1. The recording head is positioned over a recording disk 140 by arm 230 on shaft 234, and uses the recording current to generate a magnetic field 7 that writes a plurality of bits including bit 8 in a magnetic recording medium (not shown) on the recording disk. As described later, a key feature is that the recording data sequence and recording current contain instructions directing the recording head to intermittently turn off the magnetic field during a plurality of time periods $t_{OFF}$ in the write process such that the total recording time ($t_{REC}$) including current rise time, magnetic field rise time, and switching time for each of the plurality of bits is less than the bit duration. Thus, there is a time period $t_{OFF}$ in each bit duration where the sum ($t_{REC}+t_{OFF}$) equals the bit duration for each of the plurality of bits in a concentric track on a magnetic recording medium. Preferably, $t_{OFF}$ is at least 100 picoseconds (ps) to realize a significant increase in TPI capability.

There is a plurality of bits within each concentric track, and typically thousands of tracks that are formed within zones called an outer diameter (OD) 9a, middle diameter (MD) 9b, and inner diameter (ID) 9c on the HDD recording disk. Data is recorded in the magnetic recording medium in units of bit length that are integer multiples of T. Data (1 or 0) is written on each bit as the magnetic recording head passes over the selected bit on the recording disk. It should be understood that bits within the OD zone rotate in a circular motion at a greater velocity than bits within the MD zone, and MD zone bits rotate at a faster velocity than bits within the ID zone.

Figure 5:
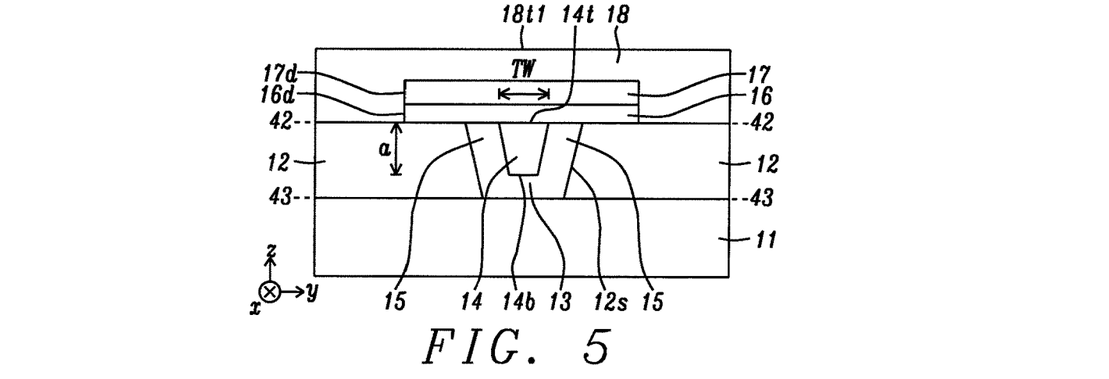
FIG. 5 is an ABS view of a PMR write head that depicts a main pole shape with a down-track length and track width, and an all wrap around (AWA) shield structure according to an embodiment of the present disclosure.

Referring to FIG. 5, an ABS view of a PMR write head with an all wrap around (AWA) shield design is shown according to one embodiment of the present disclosure wherein a main pole has a front portion (main pole tip) with a magnetic medium facing side 14 comprised of a leading edge 14b, and a trailing edge 14t that defines a track width TW in a cross-track direction, and a down-track length a between the leading and trailing edges. The AWA shield structure has a trailing shield comprised of an upper 16-19 kG magnetic layer 18 and a 19-24 kG hot seed layer 17 where the hot seed layer and write gap 16 have sides 17d, 16d, respectively, that are coplanar. Each side shield 12 has a top surface that adjoins trailing shield layer 18 at plane 42-42 that also includes trailing edge 14t, and is separated from the main pole 14 by side gaps 15. There is also a leading shield 11, which is separated from leading edge 14b by a lead gap 13. The leading shield adjoins the side shields at plane 43-43. The AWA shield design is employed to improve field gradients in the down-track and cross-track directions as well as enhance adjacent track erasure (ATE) performance. However, the magnetic pulse recording scheme is not limited to the PMR write head structure shown in FIG. 5, and is compatible with other main pole shapes and PMR write head designs as appreciated by those skilled in the art.

Figure 6:
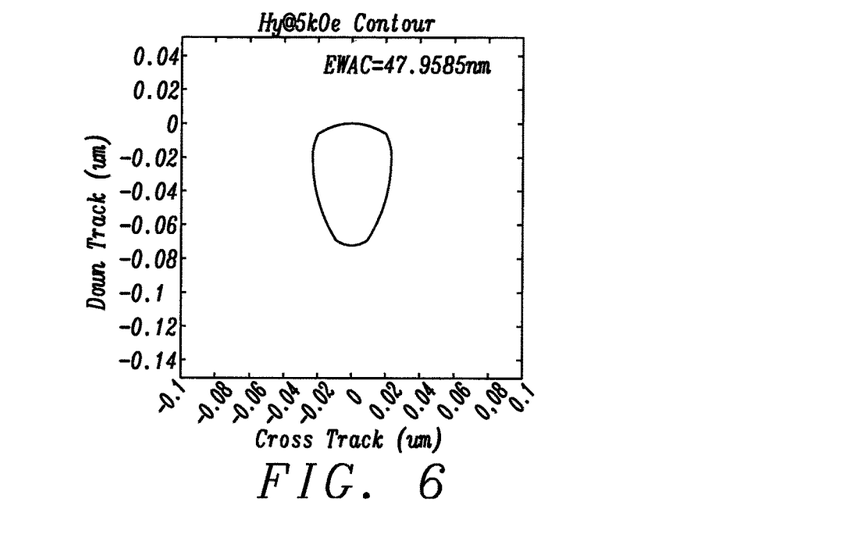
FIG. 6 shows a write magnetic field contour plot of the main pole in FIG. 5 on the media plane.

FIG. 6 shows a 5000 Oe write contour plot on the plane of a magnetic recording medium that is generated by a magnetic field originating from the main pole in FIG. 5. The down-track length is about 70 nm while the cross-track width (TW) is around 40 nm in this example. With each new product cycle, main pole dimensions tend to shrink in order to meet the HDD requirements for ADC growth. However, main pole down-track length is generally maintained in the 50 nm to 150 nm range to sustain sufficient writability (overwrite capability). Considering the BPI values in the most advanced HDD designs, the shortest length for a 1T bit is proximate to 10 nm, and is significantly less than the main pole down-track length.

Figure 7:
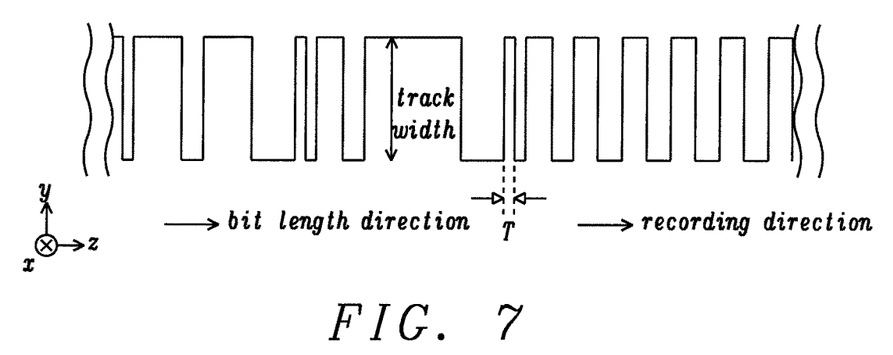
FIG. 7 depicts a random bit sequence during a write pattern in which minimum bit length is T and bit lengths are 1 T and integer multiples thereof.

Referring to FIG. 7, a recording pattern is illustrated with random bit lengths that are integer multiples of the minimum bit length T. The bit length direction is also the recording direction. Track width (TW) is constant from one bit to the next along the recording direction.

Figure 8:
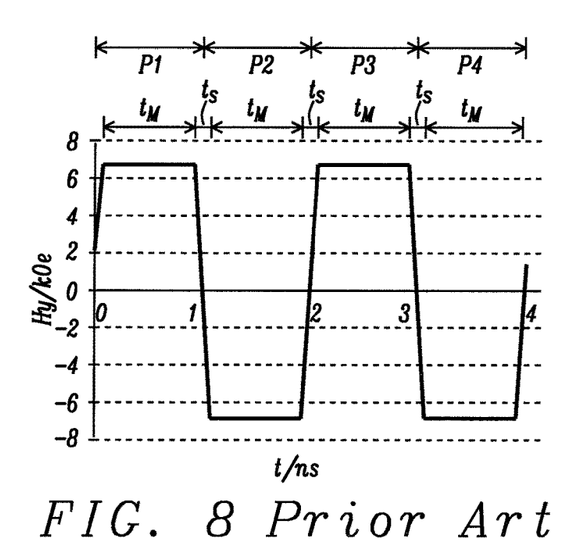
FIG. 8 shows a dynamic magnetic field profile provided by a conventional write scheme where a maximum amplitude field is maintained except to switch the polarity during a period of about 100 ps.

FIG. 8 shows a dynamic magnetic field profile for a conventional PMR recording method where the magnetic recording current from the preamp has a waveform that directs the main pole to maintain a saturated state as the main pole travels the entire bit length (except for switching time) in each bit in a concentric track. Thus, the conventional magnetic field has maximum amplitude during time periods ($t_M$) and is only reduced during switching times ($t_S$) that overlap the beginning and end of each consecutive bit duration. In other words, the sum ($t_M+t_S$) equals the bit duration. Bit durations (P1, P2, P3, P4) correspond to time periods when a first bit, second bit, third bit, and fourth bit, respectively, are sequentially written. In this micromagnetic modeling study, each bit duration is 1 ns and switching time to change polarity is set at 100 ps. Due to the limited disk rotation speed, the travel time of each bit may be significantly longer than the writing time required to write the entire bit.

Figure 9A:
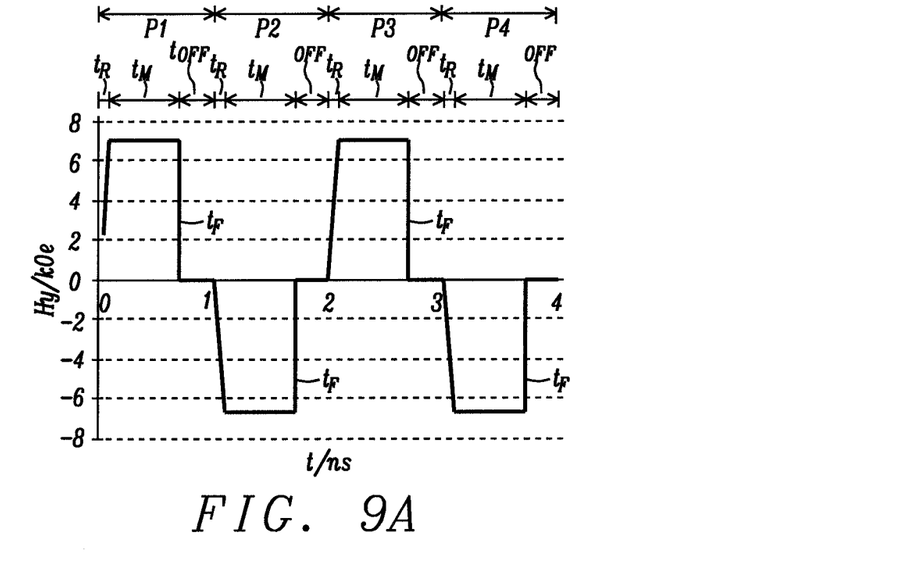
FIG. 9A illustrates a magnetic pulse recording scheme according to an embodiment of the present disclosure where the magnetic field is reduced to zero during a time period $t_{OFF}$ after writing each bit, and $t_{OFF}$ is constant for each bit in the bit sequence.

Referring to FIG. 9A, a micromagnetic modeling study depicts the dynamic magnetic field profile for a magnetic pulse recording scheme according to a first embodiment of the present disclosure. A key feature is that the magnetic field is turned off for a constant period of time ($t_{OFF}$) during each bit duration (P1, P2, P3, P4) when each bit duration is the same length of time. An important condition for magnetic pulse recording to be operable and effective is that total recording time ($t_{REC}$) which includes current rise time, magnetic field rise time, and magnetic fall time must be less than the duration of a bit to enable the time period $t_{OFF}$ between an end of the maximum amplitude time period ($t_M$) in each bit, and the beginning of magnetic rise time ($t_R$) in the next bit to be written to. Thus, each bit has $t_{REC}$ equal to the sum ($t_M+t_R+t_F$) where $t_F$ is the magnetic fall time. Furthermore, a second important condition for magnetic pulse recording is the bit length must be less than the down track length of the main pole bubble on the magnetic recording medium. In the example, down-track main pole length is 70 nm, bit length=12.7 nm, bit duration is 1 ns, $t_{OFF}$=300 ps, $t_M$=500 ps, and $t_R$ is 200 ps for each bit in the bit sequence. Here, $t_F$ is essentially a vertical drop in the magnetic field such that the time required to reduce the magnetic field from $t_M$ to zero is less than about 10 ps.

According to the first embodiment, ($t_{REC1}$) for a first bit is equal to ($t_{REC2}$) for a second bit, and to $t_{REC}$ for all other bits in the magnetic recording medium. Although the maximum amplitude of the magnetic field applied during P1 is shown equal to that of the magnetic fields applied during P2, P3, and P4, the present disclosure anticipates that the magnetic field may fluctuate somewhat from one bit to the next.

Figure 9B:
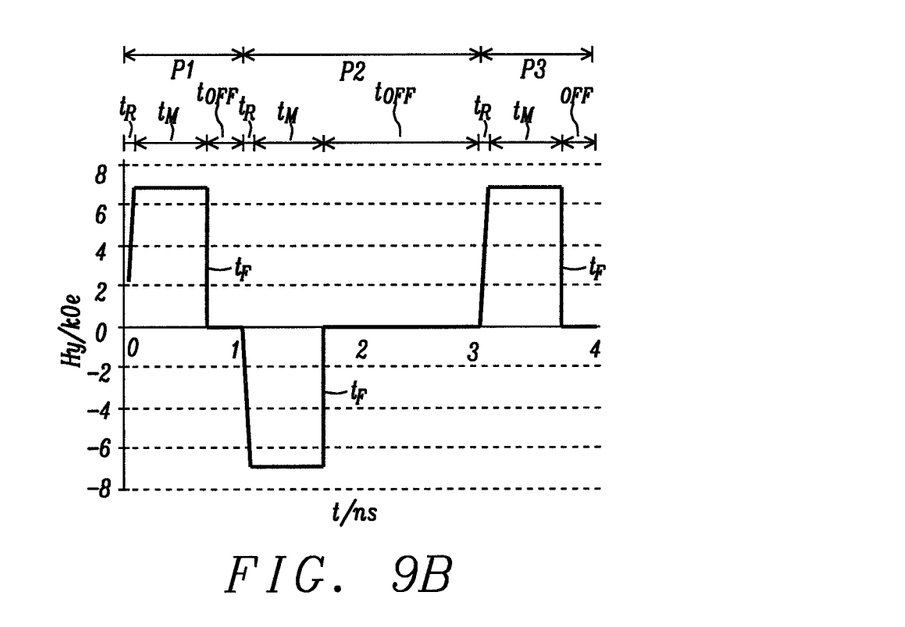
FIG. 9B illustrates a magnetic pulse recording scheme according to another embodiment of the present disclosure where the magnetic field is reduced to zero during a time period $t_{OFF}$ after writing each bit, and $t_{OFF}$ increases as bit duration increases such that total recording time is constant for each bit.
Figure 10:
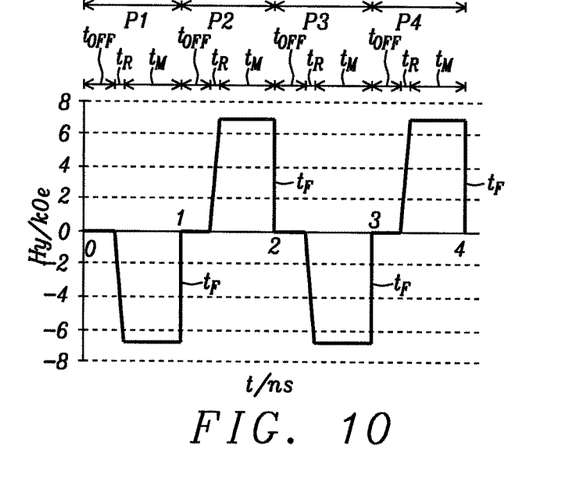
FIG. 10 depicts a magnetic pulse recording scheme according to an embodiment of the present disclosure where the magnetic field is reduced to zero in time period $t_{OFF}$ before a recording time in each bit duration.

Referring to FIG. 10, the present disclosure also anticipates that the $t_{OFF}$ period shown in FIGS. 9A, 9B may occur before $t_{REC}$ in a bit. All other conditions mentioned with regard to embodiments shown in FIGS. 9A, 9B are retained. In particular, bit duration=$t_{REC}+t_{OFF}$ wherein $t_{REC}$ is the sum ($t_M+t_R+t_F$).

Of course, conventional preamps in HDD may require modifications to accommodate additional current setting parameters to include $t_{OFF}$ and wherein $t_{OFF}$ is varied as a function of bit length, bit duration, and zone according to one or more of the embodiments described herein. However, a new preamp design is the subject of another disclosure. Preamp current settings may also be updated to adjust the $t_{OFF}$ waveform. In the embodiments shown in FIG. 9A and FIG. 9B, magnetic field strength may be turned off in segment $t_F$ representing a minimum magnetic fall time (essentially a vertical drop from $t_M$ to $t_{OFF}$) that is believed to be less than 10 ps. However, in other embodiments, $t_F$ may encompass a non-vertical but linear slope requiring substantially more than 10 ps, or a non-vertical and non-linear slope such as a step function that may require a time period of 100 ps or more.

Figure 11A:
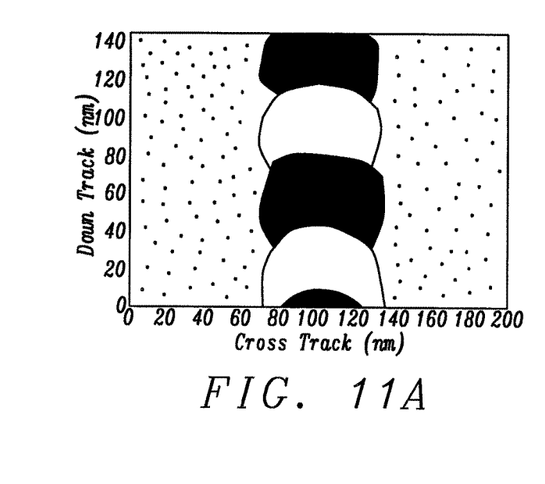
FIG. 11A shows a recorded media pattern of a conventional field profile.
Figure 11B:
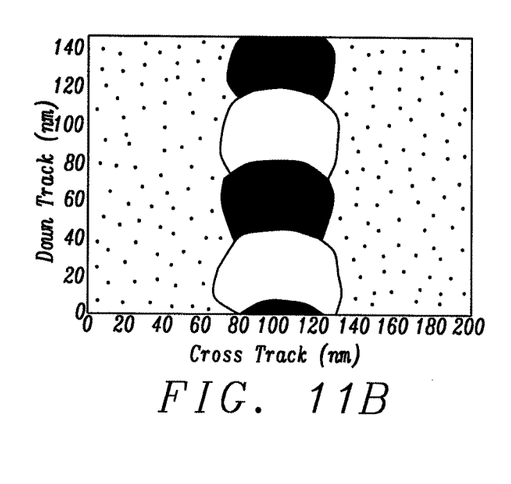
FIG. 11B depicts a recorded media pattern of a magnetic pulse field profile according to an embodiment of the present disclosure.

FIG. 11A depicts recorded media patterns that are generated with the conventional magnetic field profile in FIG. 8, and FIG. 11B shows recorded media patterns generated with the magnetic pulse field of the present disclosure illustrated in FIG. 9A. Recording velocity is 33 m/sec and the data rate is 3 Gb/sec. The 3 T bit length is 38.1 nm with a 1 ns bit duration. With magnetic pulse recording and a 700 ps total recording time, we find that a narrower track width is realized while on-track performance is maintained. Thus, TPI is improved without compromising BPI, which equates to a net gain in ADC. Moreover, SNR is substantially maintained with magnetic pulse recording as demonstrated in Table 1 where the data is provided for a recording velocity of 30 m/sec., and for 2 T and 3 T bit lengths of 25.4 nm and 38.1 nm, respectively.

TABLE 1

| SNR comparison for 2 T and 3 T bits with 1 ns bit duration | | |
| --- | --- | --- |
| lw waveform | 2 T SNR | 3 T SNR |
| Conventional | 14 dB | 17.62 dB |
| Pulse ($t_{OFF}$) = 0.3 ps | 14.8 dB | 18.66 dB |

Although the exemplary embodiment in FIG. 9A shows each bit in a certain bit sequence may have a constant bit duration in a concentric track, it should be understood that for each recording velocity, bit duration will increase for bits in a track that is in zone ID, for example, that is closer to the center of the recording disk, and will decrease for bits in tracks that are a greater distance from the center of recording disk such as zone OD. As shown in Table 2, the recording velocity for 1 T bits varies from 8.1 m/sec to 30.7 m/sec depending on zone location (ID, MD, or OD) for disk rotation speeds of 5400 rpm, 7200 rpm, and 10000 rpm, and with a storage density of 2000 kFCI in mobile (2.5") recording. Bit length is 12.7 nm.

TABLE 2

Recording velocity for 2000 kFCI in 2.5" HD

| Zone | Radius (inch) | Radius (mm) | v_5400 | v_7200 | v_10000 |
|---|---|---|---|---|---|
| ID | 0.56 | 14.3 | 8.1 m/sec | 10.8 m/sec | 15.0 m/sec |
| MD | 0.87 | 22.2 | 12.6 m/sec | 16.7 m/sec | 23.2 m/sec |
| OD | 1.15 | 29.3 | 16.6 m/sec | 22.1 m/sec | 30.7 m/sec |

In Table 3, the 1 T bit duration shown as T_5400, T_7200, and T_10000 may vary from about 0.4 ns (OD) to 1.6 ns (ID) in mobile (2.5") recording, for a storage density of 2000 kFCI and disk rotation speeds of 5400 rpm, 7200 rpm, and 10000 rpm, respectively. Bit length is 12.7 nm.

TABLE 3

1 T bit duration for 2000 kFCI in 2.5" HD

| Zone | Radius (inch) | Radius (mm) | T_5400 | T_7200 | T_10000 |
|---|---|---|---|---|---|
| ID | 0.56 | 14.3 | 1.6 ns | 1.2 ns | 0.8 ns |
| MD | 0.87 | 22.2 | 1.2 ns | 0.8 ns | 0.5 ns |
| OD | 1.15 | 29.3 | 0.8 ns | 0.6 ns | 0.4 ns |

According to another embodiment of the present disclosure depicted in FIG. 9B, $t_R$ and $t_M$ remain constant while $t_{OFF}$ is varied for a random bit sequence in a concentric track where bit lengths and bit durations are variable. Here, a random bit sequence such as 1 T, 2 T, 1 T (or 2 T, 4 T, 2 T) during time periods P1, P2, and P3, respectively, is shown where $t_{OFF}$ is lengthened from 0.3 ns for a 1 T bit with a 1 ns bit duration to 1.3 ns for the 2 T bit where bit duration is 2 ns. Therefore, bit duration for all bits is expressed as the sum $(t_M+t_R+t_F+t_{OFF})$. The modeling results shown in FIG. 9B assume that $t_{REC}$ ($t_M$ $t_R$ $t_F$) is constant for all bits. Thus, $t_R$ and $t_M$ remain at 200 ps and 500 ps, respectively, while $t_F$ is <10 ps.

In other embodiments where a bit sequence may comprise small bit durations around 0.3 to 0.4 ns for a certain number of bits, especially in an OD zone of a magnetic medium, total recording time that is represented by the sum $(t_M+t_R+t_F)$ may be reduced to a minimum value of about 200 ps, and $t_{OFF}$ may be reduced to a range of 100 ps to 200 ps such that $(t_M+t_R+t_F+t_{OFF})$=bit duration. Even smaller $t_{OFF}$ values proximate to 50 ps may be applied when the time required to turn off the magnetic field ($t_F$) is a minimum time period of less than 10 ps. In other embodiments where $t_F$ follows a waveform requiring a time period of 100 ps or more, then $t_{OFF}$ is preferably greater than $t_F$ in order to realize a significant benefit in reduced cycle time, and improved TPI. With bit durations substantially larger than 0.3 ns to 0.4 ns, the $(t_M+t_R+t_F)$ value may be held at 200 ps while $t_{OFF}$ is increased such that the total $(t_M+t_R+t_F+t_{OFF})$=bit duration. Note that after turning on the magnetic field during magnetic rise time $t_R$, the footprint of the write bubble is already formed and is the reason why a magnetic pulse with a $t_{REC}$ that is proximate to 200 ps is sufficient to write 1 T bits in the FIG. 9A waveform as well as 1 T and 2 T bits shown in the FIG. 9B waveform.

The present disclosure anticipates that in some embodiments, $t_{REC}$ may be variable but in the range of 100 ps to 700 ps for magnetic pulse recording on all tracks in a certain magnetic recording medium. For example, a $t_{REC}$ from 100 ps to 200 ps may be employed in an OD zone for a 1 T bit where a bit duration is about 0.3 to 0.4 ns while a $t_{REC}$ substantially greater than 200 ps is used in an ID zone in the same magnetic medium for a 1 T bit where a bit duration is larger than 0.4 ns. Preferably, $t_{REC}$ is held constant for all bits within a concentric track while $t_{OFF}$ is increased as bit duration increases for larger bits (2 T-6 T or greater) in the track.

In Table 4, the recording velocity for 1 T bits varies from 10.6 m/sec to 46.7 m/sec depending on zone location (ID, MD, or OD) for disk rotation speeds of 5400 rpm, 7200 rpm, and 10000 rpm, and with a storage density of 2000 kFCI in nearline (3.5") recording. Bit length is 12.7 nm.

TABLE 4

Recording velocity for 2000 kFCI in 3.5" HD

| Zone | Radius (inch) | Radius (mm) | v_5400 | v_7200 | v_10000 |
|---|---|---|---|---|---|
| ID | 0.74 | 18.8 | 10.6 m/sec | 14.2 m/sec | 19.7 m/sec |
| MD | 1.26 | 32.1 | 18.2 m/sec | 24.2 m/sec | 33.6 m/sec |
| OD | 1.76 | 44.6 | 25.2 m/sec | 33.6 m/sec | 46.7 m/sec |

As shown in Table 5, 1T bit duration may vary from about 0.3 ns (OD) to 1.2 ns (ID) in nearline (3.5") recording for a storage density of 2000 kFCI and disk rotation speeds in the range of 5400 to 10000 rpm. Bit length is 12.7 nm.

TABLE 5

1 T bit duration for 2000 kFCI in 3.5" HD

| Zone | Radius (inch) | Radius (mm) | T_5400 | T_7200 | T_10000 |
|---|---|---|---|---|---|
| ID | 0.74 | 18.8 | 1.2 ns | 0.9 ns | 0.6 ns |
| MD | 1.26 | 32.1 | 0.7 ns | 0.5 ns | 0.4 ns |
| OD | 1.76 | 44.6 | 0.5 ns | 0.4 ns | 0.3 ns |

Assuming $t_{REC}$ for a magnetic recording system is 400 ps, the magnetic pulse recording scheme is applicable to most of the 1 T bit to 6 T bits at 2000 kFCI or higher linear density when the two conditions described previously are satisfied. However, $t_{REC}$ must be substantially reduced below 400 ps to enable a minimum $t_{OFF}$ value of 100 ps, for example, for the MD and OD zones at 10000 rpm or the OD zone at 7200 rpm in Table 5 where bit duration is 0.4 ns or less.

Table 6 shows the probability of different frequencies/bits in a random bit sequence. Duration weighting is provided for each of the 1 T to 6 T bits. The sum E in the Probability column is slightly less than 100% in view of a limited number of bits larger than 6 T such as 7 T, 8 T, etc. in a random bit sequence.

TABLE 6

Probability of different frequencies/bits in a random bit sequence

| nT | Probability | nxProbability | Duration weighting |
|---|---|---|---|
| 1 T | 50% | 50% | 25.20% |
| 2 T | 25% | 50% | 25.20% |
| 3 T | 12.50% | 37.80% | 19.10% |
| 4 T | 6.30% | 24.80% | 12.50% |
| 5 T | 3.10% | 15.50% | 7.80% |
| 6 T | 1.60% | 9.60% | 4.80% |
| Σ | 98.5% | 187.70% | 94.60% |

Considering the 1 T bit to 6 T bit duration weighting found in Table 6, the duty cycles necessary for each frequency/bit are estimated for magnetic pulse recording. According to the data shown in Table 7, magnetic pulse recording requires <30% of the duty cycles compared with conventional magnetic recording (CMR) in mobile HDD, and <50% of the duty cycles of CMR in nearline HDD. The duty cycle sums in the bottom row are obtained by multiplying the duration weighting in Table 6 and the duty cycle % in Table 7 for each of the 1 T to 6 T bits, and then adding the total of the six products.

TABLE 7

Duty cycles for each frequency/bit in pulse writing vs. conventional writing

| | Mobile HDD_2.5" | | | Nearline HDD_3.5" | | |
|---|---|---|---|---|---|---|
| nT | ID | MD | OD | ID | MD | OD |
| 1T | 25.00% | 40.00% | 50.00% | 44.44% | 80.00% | 100.00% |
| 2T | 12.50% | 20.00% | 25.00% | 22.22% | 40.00% | 50.00% |
| 3T | 8.33% | 13.33% | 16.67% | 14.81% | 26.67% | 33.33% |
| 4T | 6.25% | 10.00% | 12.50% | 11.11% | 20.00% | 25.00% |
| 5T | 5.00% | 8.00% | 10.00% | 8.89% | 16.00% | 20.00% |
| 6T | 4.17% | 6.67% | 8.33% | 7.41% | 13.33% | 16.67% |
| Σ | 12.41% | 19.86% | 24.83% | 22.07% | 39.72% | 49.65% |

According to another embodiment of the present disclosure, a magnetic pulse scheme is provided for conditions where bit length is greater than the main pole down track length. For example, if 1 T bit length is 12.7 nm and main pole down-track length is 70 nm or less, then a 6 T, 7 T, 8 T, or longer bits will have a bit length considerably above 70 nm. As a result, the magnetic pulse recording scheme described in previous embodiments cannot be employed to write bits with a bit length greater than the main pole down-track length. Of course, main pole down-track length could be lengthened but at the cost of overall magnetic performance. Instead, we disclose the following magnetic pulse scheme that is effective for all bits in a magnetic recording medium including those bits having a bit length greater the main pole down-track length. In particular, a magnetic pulse recording scheme according to one of the previous embodiments of the present disclosure is employed when bits have a bit duration <MP down-track length. However, to write bits with a bit duration >MP down-track length, a conventional recording scheme such as the one depicted in FIG. 8 is applied such that $t_{REC}+t_{SWITCHING}$=bit duration. Thus, the present disclosure encompasses a combination of magnetic pulse recording and conventional recording when writing a plurality of bits on a magnetic recording medium.

Since TPI and ATE are strongly dependent on the fringing field generated from adjacent track writing, and considering the number of duty cycles is substantially decreased with magnetic pulse recording according to our micromagnetic modeling study, magnetic pulse recording enables a significant improvement in cross-track performance while maintaining on-track performance. Furthermore, magnetic pulse recording is expected to provide more margin for write designs and reduce the challenges for ADC improvement.

While the present disclosure has been particularly shown and described with reference to, the preferred embodiment thereof, it will be understood by those skilled in the art that various changes in form and details may be made without departing from the spirit and scope of this disclosure.

We claim:

1. A magnetic recording apparatus, comprising:
    (a) a high density disk (HDD) controller configured to input a data sequence to a preamplifier (preamp);
    (b) wherein the preamp is configured to convert the data sequence to a recording current and to send the recording current to a write head in a perpendicular magnetic recording (PMR) write head on a head gimbal assembly (HGA); and
    (c) wherein the PMR write head comprises a main pole that terminates at an air bearing surface proximate to a magnetic recording medium, configured so that the recording current causes the write head to generate a magnetic field that is applied from the main pole to write a plurality of bits in the magnetic recording medium such that the magnetic field is turned off for a certain period ($t_{OFF}$) of time in a bit duration when a total recording time ($t_{REC}$) for each bit is less than the bit duration and the bit duration equals the sum ($t_{REC}$+$t_{OFF}$), and when the main pole has a down-track length greater than a bit length for each of the plurality of bits.

2. The magnetic recording apparatus of claim 1 wherein $t_{REC}$ equals the sum ($t_M$+$t_R$+$t_F$) where $t_R$ is a magnetic field rise time, $t_M$ is a time period of maximum magnetic field amplitude, and $t_F$ is a magnetic fall time wherein the magnetic field is reduced to zero.

3. The magnetic recording apparatus of claim 1 wherein $t_{REC}$ is maintained at a constant value for writing a first bit and a second bit in a concentric track while $t_{OFF}$ is increased when the bit duration increases from the first bit to the second bit.

4. The magnetic recording apparatus of claim 1 wherein the magnetic field is reduced to zero in a period of less than about 10 picoseconds (ps) during $t_F$.

5. The magnetic recording apparatus of claim 1 wherein the magnetic field is reduced to zero with a linear slope, or with a non-linear wave function during $t_F$.

6. The magnetic recording apparatus of claim 1 wherein the bit length is about 10 nm to 50 nm, and the main pole down-track length is about 50 nm to 150 nm.

7. The magnetic recording apparatus of claim 1 wherein $t_{REC}$ for each bit is about 200 ps to 400 ps.

8. The magnetic recording apparatus of claim 1 wherein a minimum bit duration is about 0.3 ns when writing a bit in a magnetic recording medium of a mobile hard disk drive (HDD) with a 2.5 inch diameter, or in a magnetic recording medium of a nearline HDD with a 3.5 inch diameter.

9. The magnetic recording apparatus of claim 1 wherein a storage density of the magnetic recording medium is about 2000 kilo flux changes per inch (kFCI) or greater.

10. The magnetic recording apparatus of claim 1 wherein the magnetic recording medium further comprises a plurality of bits having a bit length greater than the main pole down-track length, and wherein $t_{REC}$ equals the bit duration for the aforementioned plurality of bits.

11. The magnetic recording apparatus of claim 1 wherein the HGA further comprises a suspension that supports a flexure and slider on which the PMR write head is mounted, and wherein the suspension also comprises a load beam with one end connected to the flexure, and a base plate connected to the other end of the load beam.

12. The magnetic recording apparatus of claim 11 wherein the magnetic recording medium is positioned opposite to the slider, and the magnetic recording apparatus further comprises:
(a) a spindle motor that rotates and drives the magnetic recording medium; and
(b) a device that supports the slider, and that positions the slider relative to the magnetic recording medium.

13. A magnetic recording method, comprising:
(a) applying a first magnetic field from a main pole in a perpendicular magnetic recording (PMR) write head to a first bit in a magnetic recording medium during a first period of time that is a total recording time ($t_{REC1}$) for the first bit wherein $t_{REC1}$ includes a magnetic fall time during which the first magnetic field is reduced to zero, the first bit has a first bit duration, and a first bit length;
(b) maintaining the zero magnetic field during a second period of time ($t_{OFF1}$) in the first bit duration such that the sum ($t_{REC1}+t_{OFF1}$) equals the first bit duration, and $t_{OFF1}>0$;
(c) applying a second magnetic field from the main pole to a second bit in the magnetic recording medium during a third period of time that is a total recording time ($t_{REC2}$) for the second bit where $t_{REC2}$ includes a magnetic fall time ($t_F$) during which the second magnetic field is reduced to zero, the second bit has a second bit duration and a second bit length; and
(d) maintaining the zero magnetic field from the third period of time during a fourth period of time ($t_{OFF2}$) in the second bit duration such that the sum ($t_{REC2}+t_{OFF2}$) equals the second bit duration, and $t_{OFF2}>0$.

14. The magnetic recording method of claim 13 wherein the first bit duration equals the second bit duration, $t_{REC1}$ equals $t_{REC2}$, and $t_{OFF1}$ equals $t_{OFF2}$.

15. The magnetic recording method of claim 13 wherein the second bit duration is greater than the first bit duration, $t_{REC1}$ equals $t_{REC2}$, and $t_{OFF2}$ is greater than $t_{OFF1}$.

16. The magnetic recording method of claim 13 wherein the main pole has a down-track length that is greater than each of the first bit length and second bit length.

17. The magnetic recording method of claim 16 wherein the main pole down-track length is from 50 nm to 150 nm, and the first and second bit lengths are from 10 nm to 50 nm.

18. The magnetic recording method of claim 13 wherein the magnetic recording medium is formed on a 2.5 inch disk in a mobile hard disk drive (HDD), or on a 3.5 inch disk in a nearline HDD.

19. The magnetic recording method of claim 13 wherein $t_{REC1}$ and $t_{REC2}$ are from about 200 picoseconds (ps) to 400 ps.

20. The magnetic recording method of claim 19 wherein each of the first and second bit durations are greater than or equal to about 0.3 nanoseconds.

21. The magnetic recording method of claim 13 wherein $t_F$ in each of $t_{REC1}$ and $t_{REC2}$ is about 10 ps or less.

22. The magnetic recording method of claim 13 wherein the first and second magnetic fields are reduced to zero with a linear slope, or with a non-linear wave form.

23. The magnetic recording method of claim 13 wherein the first magnetic field has a polarity opposite to that of the second magnetic field.

* * * * *